UNITED STATES PATENT OFFICE.

JUAN F. N. MACAY, OF CHARAPOTO, ECUADOR.

MANUFACTURE OF FERRIC OXIDE AND CUPRIC CHLORIDE.

SPECIFICATION forming part of Letters Patent No. 234,595, dated November 16, 1880.

Application filed March 3, 1880. (No specimens.) Patented in England October 17, 1879, and in Germany December 12, 1879.

*To all whom it may concern:*

Be it known that I, JUAN F. N. MACAY, of Charapoto, Republic of Ecuador, have invented a new and useful Improvement in Production of Ferric Oxide, &c.; and I do hereby declare that the following is a full, clear, and exact description of the same.

My invention consists in a process of producing at one operation modified hydrated ferric oxide, ($Fe_2O_3OH_2$)—which, after being calcined, is variously known in commerce as "colcothar" (*crocus martis*) or "jewelers' rouge"— and cupric chloride, ($CuCl_2$,) the said process consisting in the mutual reaction, with access of air, as hereinafter described, of cupric oxychloride ($CuCl_23CuO, 4OH_2$) and ferrous chloride, ($FeCl_2$,) whether the last-named salt be produced by a preliminary reaction in the course of the process itself or whether it be taken already formed in any known way.

The invention also consists in the particular method herein described of producing the ferrous chloride in the course of the process itself.

I will first describe the process in its simplest form: I take a solution of ferrous chloride already formed in any known way, and I boil this solution, with free access of air, with a certain proportion of cupric oxychloride—that is to say, in practice I boil together in an open wooden vat or other suitable vessel the solution of ferrous chloride and the cupric oxychloride in the following proportions, viz: solution of ferrous chloride equivalent to 1.1 part, by weight, of the salt in the crystallized form; cupric oxychloride, 1.0 part, by weight, whereupon, by the mutual reaction of the ferrous chloride and the cupric oxychloride, the oxygen of the copper salt is exchanged for the chlorine of the ferrous salt, thereby producing cupric chloride ($CuCl_2$) and hydrated ferrous oxide, which, by taking up oxygen from the atmosphere, is converted into normal hydrated ferric oxide, ($Fe_2O_33OH_2$,) which, by the action of heat, is transformed into modified hydrated ferric oxide, ($Fe_2O_3OH_2$,) the chemical reaction being as follows: $6FeCl_2+2CuO,4OH_2+3O=3Fe_2O_3OH_2+8CuCl_2+5OH_2$. The boiling is continued until the modified hydrated ferric oxide assumes a deep-red color and a state of aggregation suitable for the purpose for which it is required.

After all the insoluble cupric oxychloride has been converted into cupric chloride ($CuCl_2$) and the iron precipitated as modified hydrated ferric oxide, the cupric chloride is or may be separated by filtration, and the residue of modified hydrated ferric oxide is or may be well washed, first with water and lastly with acidulated water, in order to free the modified hydrated ferric oxide from any salt of copper. The modified hydrated peroxide of iron may then, if necessary, be calcined in the usual way, to render the hydrated ferric oxide anhydrous and bring it to the desired color.

I will now describe the same process of producing cupric chloride and modified hydrated ferric oxide by the mutual reaction (with access of air) of cupric oxychloride and ferrous chloride, the ferrous chloride being, however, produced by a preliminary reaction in the course of the process itself. I digest or boil in a solution of chloride of sodium, (NaCl,) with access of air, a certain proportion of cupric oxychloride ($CuCl_23CuO, 4OH_2$) and of ferrous or ferric sulphate, ($FeSO_47OH_2$ or $Fe_23SO_4$.) In this case the chemical reactions are as follows: The sulphuric acid and oxygen of the ferrous or ferric sulphate combine with the sodium of the chloride of sodium, forming sulphate of oxide of sodium—*i. e.*, sulphate of soda—thus liberating the chlorine. The chlorine in the nascent state combines with the iron of the ferrous or ferric sulphate, thereby forming ferrous chloride. From this point the reaction is the same as in the former case—that is to say, by the mutual reaction of the ferrous chloride thus formed and the cupric oxychloride the oxygen of the copper salt is exchanged for the chlorine of the ferrous salt, thereby producing cupric chloride and hydrated ferrous oxide, which, by taking up oxygen from the atmosphere, is converted into normal hydrated ferric oxide, which, by the action of heat, is transformed into modified hydrated ferric oxide.

In practice I prefer to use ferrous sulphate, and proceed as follows: chloride of sodium in solution, ferrous sulphate, and cupric oxychloride in the following proportions, viz: cupric oxychloride, one part, by weight, estimated in the crystallized form; chloride of sodium, 1.7 part, by weight, estimated in the crystallized form; ferrous sulphate, 0.70 part, by weight, estimated in the crystallized form, are digested or boiled together in an open wooden vat or other suitable vessel until the modified hydrated ferric oxide assumes the desired color, as in the former case. The following is the chemical reaction: $2CuCl_2 3CuO, 4OH_2 + 12NaCl + 6FeSO_4 7OH_2 + 3O + 54OH_2 = 8CuCl_2 + 6Na_2SO_4, 10OH_2 + 3Fe_2O_3 OH_2 + 41OH_2$.

The cupric chloride is or may be filtered off, and the modified hydrated ferric oxide may be washed and calcined, as in the first case. In either case, when absolute purity of the products is required, there must be a slight excess of the cupric oxychloride or of the ferrous salt, as the case may be.

Having thus described my invention, what I claim as new is—

1. The process of producing at one operation modified hydrated ferric oxide ($Fe_2O_3 OH_2$) and cupric chloride ($CuCl_2$) by the mutual reaction, in the presence of the air, of cupric oxychloride and solution of ferrous chloride, substantially as described.

2. The combined process of producing at one operation, first, ferrous chloride from ferrous or ferric sulphate and chloride of sodium, and, secondly, modified hydrated ferric oxide and cupric chloride from the ferrous chloride thus formed and from cupric oxychloride, substantially as herein described.

The above specification of my invention signed by me this 10th day of February, 1880.

JUAN FRANCISCO NEPOMUCENO MACAY.

Witnesses:
WM. CLARK,
53 *Chancery Lane, London, Patent Agent.*
CHAS. BERKLEY HARRIS,
*Clerk to Messrs. Scorer & Harris, Notaries,* 17 *Gracechurch Street, London.*

Correction of Letters Patent No. 234,595.

It is hereby certified that in Letters Patent No. 234,595, granted Nov. 16, 1880, to Juan F. N. Macay, for improvement in the manufacture of Ferric Oxide and Cupric Chloride, on page 1, line 47, of the printed specification, the formula for two molecules of Cupric Oxychloride was erroneously printed $2\,Cu\,O, 4\,O\,H_2$ instead of $2\,Cu\,Cl_2, 3\,Cu\,O\,4\,O\,H_2$, the correct formula. Also that the date of the German patent at the head of the printed specification was erroneously printed December 12, 1879, instead of November 20, 1879; that the proper corrections have been made in the files and records of the Patent Office, and are hereby made in said Letters Patent.

Signed, countersigned, and sealed this 3d day of February, A. D. 1881.

[SEAL.]

A. BELL,
*Acting Secretary of the Interior.*

Countersigned:
E. M. MARBLE,
*Commissioner of Patents.*